Sept. 8, 1970 G. KLAUBER 3,526,983
METHOD AND APPARATUS FOR COMPOSING AND DECOMPOSING
PICTORIAL REPRESENTATIONS
Filed Sept. 7, 1967 12 Sheets-Sheet 1

INVENTOR.
GEORGE KLAUBER

ATTORNEY

INVENTOR.
GEORGE KLAUBER

BY

ATTORNEY

Sept. 8, 1970          G. KLAUBER          3,526,983
METHOD AND APPARATUS FOR COMPOSING AND DECOMPOSING
PICTORIAL REPRESENTATIONS
Filed Sept. 7, 1967          12 Sheets-Sheet 3
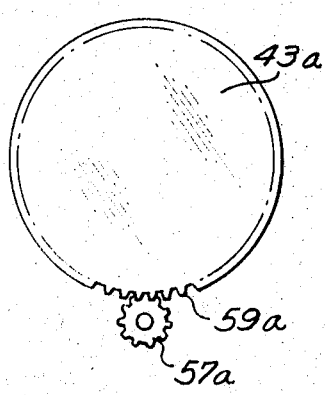
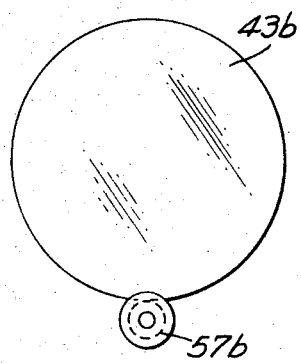
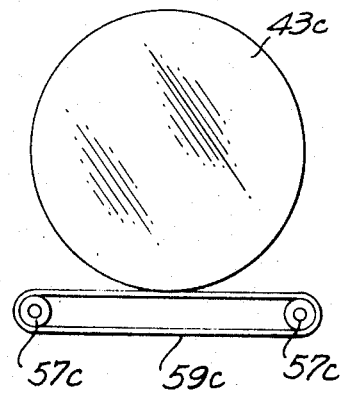
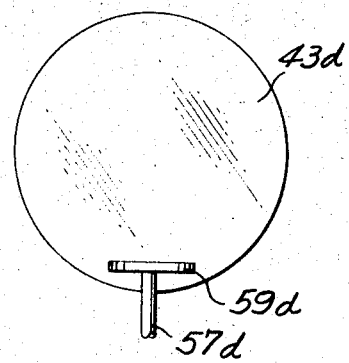
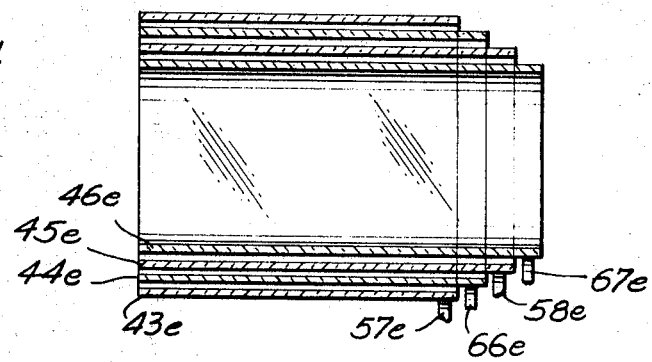
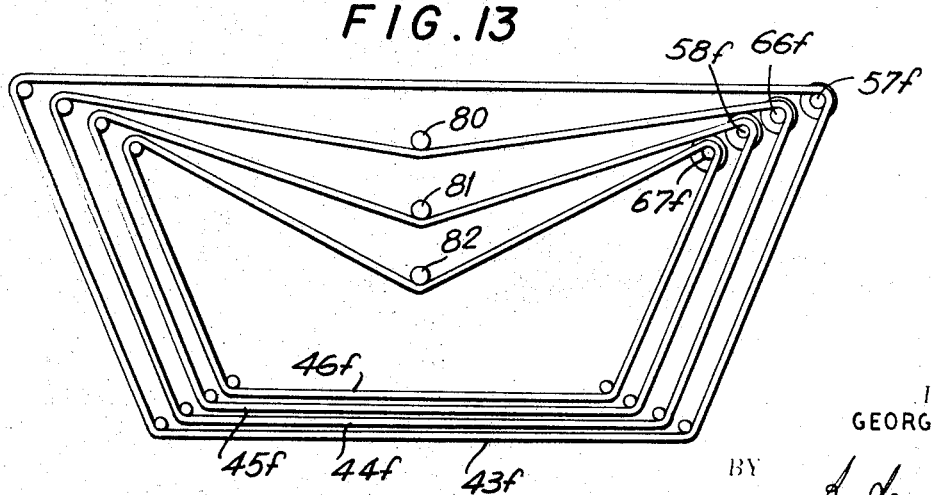
INVENTOR.
GEORGE KLAUBER
BY
ATTORNEY

INVENTOR.
GEORGE KLAUBER
BY
ATTORNEY

Sept. 8, 1970　　　　　G. KLAUBER　　　　　3,526,983
　　METHOD AND APPARATUS FOR COMPOSING AND DECOMPOSING
　　　　　　　　PICTORIAL REPRESENTATIONS
Filed Sept. 7, 1967　　　　　　　　　　12 Sheets-Sheet 10

INVENTOR.
GEORGE KLAUBER
BY
ATTORNEY

Sept. 8, 1970   G. KLAUBER   3,526,983
METHOD AND APPARATUS FOR COMPOSING AND DECOMPOSING
PICTORIAL REPRESENTATIONS
Filed Sept. 7, 1967   12 Sheets-Sheet 11

INVENTOR.
GEORGE KLAUBER
BY
ATTORNEY

United States Patent Office 3,526,983
Patented Sept. 8, 1970

3,526,983
METHOD AND APPARATUS FOR COMPOSING AND DECOMPOSING PICTORIAL REPRESENTATIONS
George Klauber, 194 Columbia Heights, Brooklyn, N.Y. 11201
Filed Sept. 7, 1967, Ser. No. 666,105
Int. Cl. G09f 13/36
U.S. Cl. 40—106.53                                         19 Claims

ABSTRACT OF THE DISCLOSURE

This invention is concerned essentially with a method and apparatus for composing and decomposing pictorial representations employing a plurality of color separations of a picture, which separations are mounted for relative movement to produce moiré effects and an intermittently reconstituted representational picture.

BACKGROUND OF THE INVENTION

While the field of display devices is extremely broad, and a great variety of visual effects have been artificially produced, the prior-art methods and devices have not heretofore presented an intermittently reconstituted picture or other information with related moiré effect.

SUMMARY

Accordingly, it is an important object of the present invention to provide an intermittent visual presentation of a fully constituted or legible picture or other intelligent information, the term picture being used hereinafter to encompass such information, wherein during the period between such intermittent presentations there are presented continually changing overlapping forms and moiré effects related to each other as well as the fully constituted intermittently appearing picture.

Another object is to provide a static display visually presenting a multi-colored abstract of related images.

It is another object of the present invention to provide a kinetic display wherein the visual presentation appears to break-up and return to intelligent information, such as the reality of a full-color picture, during which time a smooth continuing succession of abstractions of the information suffused with undulating moiré patterns is visually experienced.

Further, it is an object of the present invention to provide a process for producing a constantly changing flow of images and related moiré patterns having great artistic value.

Also, it is an object hereof to provide a method for gradually developing, after an interval of visual rhythm, a fully reconstructed image in various color tones or black and white, suitable for display purposes and motion picture or television presentation.

It is appreciated that the method and apparatus of the present invention may be employed with black-and-white pictures, utilizing black and white reproductions of color separations. Therefore, the terminology "color separations" is employed herinafter as inclusive also of black-and-white reproductions of color separations of pictures or other intelligent information.

Other objects of the present invention will become apparent upon reading the following specification and referring to the accompanying drawings, which form a material part of this disclosure.

The invention accordingly consists in the process and method steps and features of construction, combinations of elements, and arrangements of parts, which will be exemplified in the method and construction hereinafter described, and of which the scope will be indicated by the appended claims.

BRIEF DESCRIPTION OF THE DRAWING

FIGS. 8, 9, 10 and 11 are elevational views illustrating several means for effecting movement of the separations of FIGS. 3–6;

FIG. 12 is a longitudinal sectional view diagrammatically representing another embodiment of display device of the present invention;

FIG. 13 is a plan view diagrammatically representing a further embodiment of display device in accordance with the teachings of the present invention;

DESCRIPTION OF THE PREFERRED EMBODIMENTS

Figure 2:
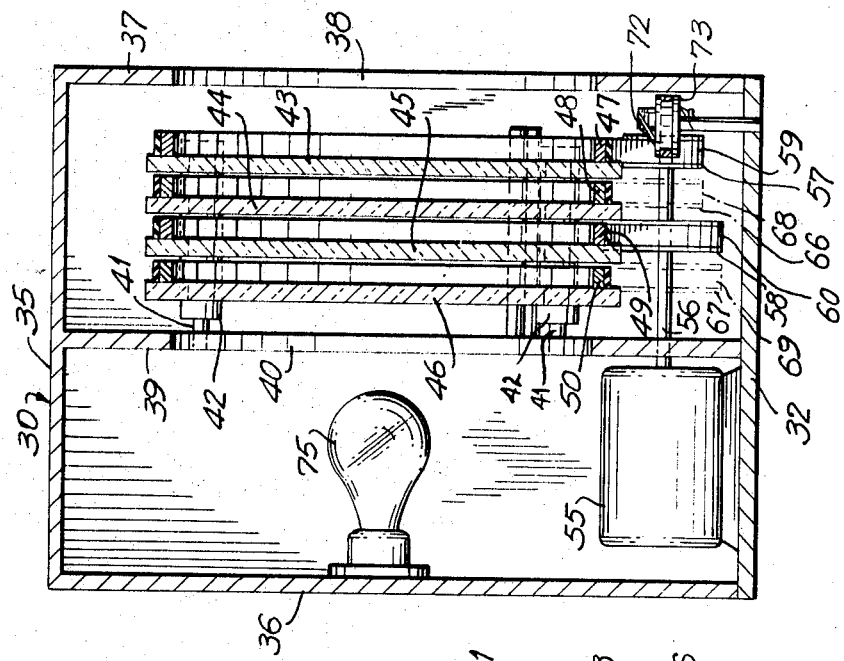
FIG. 2 is a sectional elevational view taken generally along the line 2—2 of FIG. 1.

Before describing the method and apparatus of this invention it should be understood that light contains all the colors of the spectrum, and that it is possible to separate the rays of light so that various colors will be individually visible. Filters may be utilized to obtain separations of all the color which they are designed to isolate. Such separations may be printed, for the purposes of this invention, on transparent film, or acetate sheet, or directly on clear plastic or glass, each being a generally complete representation of the total picture but in its particular color.

In a piece of normal color copy a given hue will be stronger in some parts of a picture than in others, and will also occur in mixture with other colors. The color separation preserves both these characteristics. For example, the yellow and red which mix to create orange are each separated and held on their respective separation. When plates or transparencies of these two separations are held in register and in close juxtaposition the color combination is restored, conveying the impression of orange to the eye. This mixture takes place visually, and not physically. This occurs because the separation print comprises varying concentrations and sizes of half-tone dots of color. Where two or more colors are necessary to make an intermediate hue, two or more of the plates or prints carry an appropriate amount of dots. Generally, four color separations, red, yellow, blue and black, will produce a full color image. More or less color separations may be likewise utilized; three-color half-tones and two-color half-tones being generally common.

In setting the various separations in close juxtaposition and in register, the dots of each color appear in view, to a considerable extent, side by side, thus to produce a full color picture. The resulting "mixture," however, is a visual impression—not a physical mixture of pigments. That the mixture seems to be physical is due wholly to the fact that in normal process reproduction the dots are too small to be seen separately.

Now it will be obvious that by maintaining the various separations in adjacent overlying relationship and by their relative movement out of registration, the superimposition of the images or color separations will be comparable to a futuristic abstract painting, in motion if the various separations are maintained in motion, because the color image dot patterns of each separation overlap and blend together in such a way as to destroy the static reality of the subject and compose a constantly changing flow of images. If the relative movement is maintained then during the transition of images moiré patterns of new and changing hues will flash and undulate to the rhythm of the relative movement of the screened halftones. The dot patterns of these half-tones moving out of register form geometric clusters and waves known as moirés, which create a pulsating, somewhat psychedelic, visual rhythm at evolving intervals.

As previously stated, two or more color separations of any of a variety of combinations of the colors of the spectrum may be employed. Also, as noted hereinbefore, the term is used to include black and white pictures or reproductions of color separations.

Figure 1:
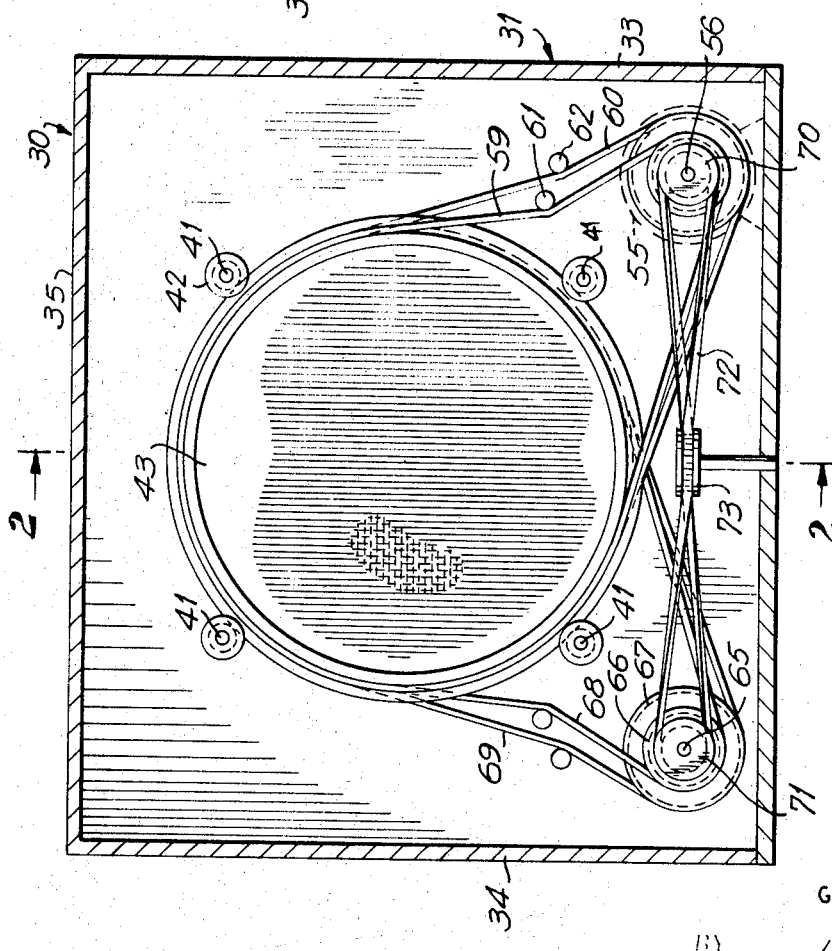
FIG. 1 is a front elevational view showing a display device of the present invention, with its front wall or cover removed.
Figure 3:
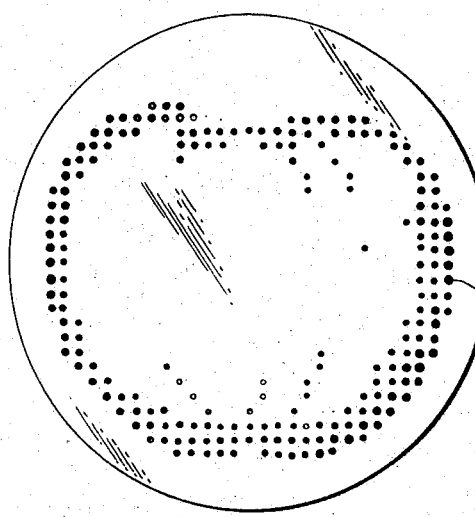
FIGS. 3, 4, 5 and 6 are diagrammatic representations of several components of the device of FIGS. 1 and 2 representing individually mounted color separations apart from the assembled device.
Figure 4:
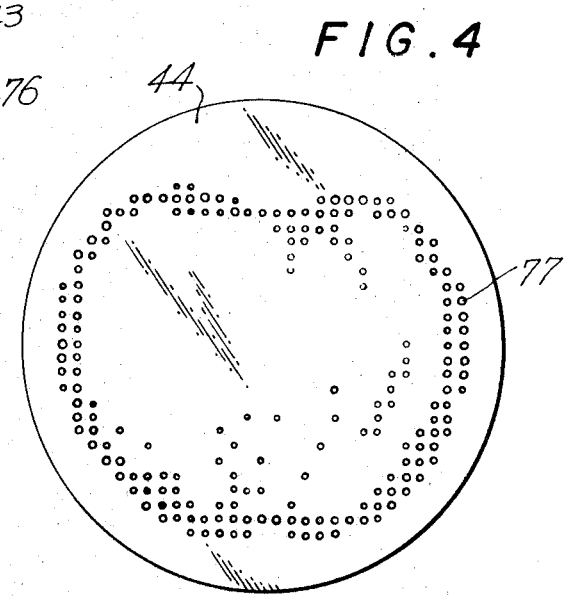
Figure 5:
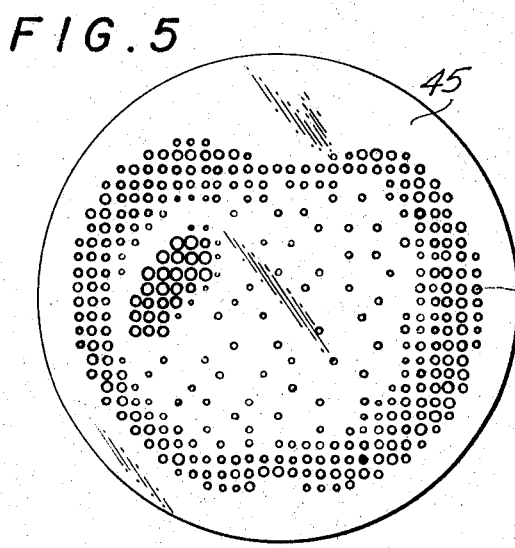
Figure 6:
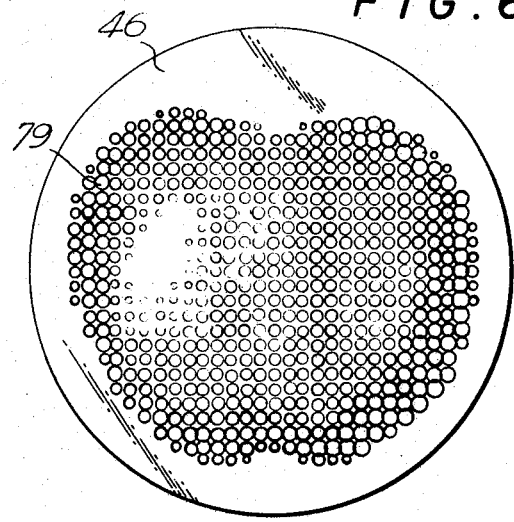

Referring now more particularly to the drawing, and specifically to FIGS. 1–6 thereof, a display apparatus of the present invention is shown in FIGS. 1 and 2 and there generally designated 30. The display apparatus 30 may include a housing or case 31 having a bottom wall 32, side walls 33 and 34 upstanding from opposite sides of the bottom wall, a top wall 35 extending across the upper ends of the side walls, a rear wall 36 extending between rear edges of the bottom, sides and top walls, and a front wall 37 extending between the front edges of the bottom, sides and top walls. The front wall may be provided with a central thru opening or viewing window 38, and an internal wall or partition 39 may be fixed in the housing 31, in spaced parallelism between the rear and front walls 36 and 37. The inner partition 39 is provided with a central thru opening 40, and carries a plurality of shafts 41 projecting forwardly from the partition in spaced relation about the partition opening 40. The shafts 41 are each provided with a rotary sleeve or roller 42, and a plurality of light-permeable or transparent discs or mounting members 43, 44, 45 and 46 are arranged in parallel spaced facing relation and interposed between the several rollers 42 for axially rotatable support thereby. Thus, the discs 43–46, which provide mounting plates as will appear presently, are interposed between the front wall 37 and partition 39 in substantial alignment with the front wall opening 38 and partition opening 40, and are mounted for generally coaxial rotation in their respective planes. The discs or mounting plates 43, 44, 45 and 46 may each be provided on its forward face with a respective annular drum or belt flange 47, 48, 49 and 50.

On the bottom wall 32, adjacent to one side wall 33, rearward of the partition 39, there may be mounted a drive or motor 55 having a drive shaft 56 extending rotatably through the partition 39 generally parallel to the rotary axis of the several mounting plates or discs 43–46. The drive shaft 56 may carry a pair of pulleys 57 and 58, keyed to the drive shaft, and in respective coplanarity with the flange portions of certain of the mounting plates, say plates 43 and 45. Thus, drive belts 59 and 60 may be trained about respective pulleys 57 and 58, the former drive belt passing about the flange 47 of mounting member or plate 43, and the latter belt being trained about the flange 49 of mounting member 45. In addition, a pair of idler rolls or pins 61 and 62 may project from the partition 39 for tensioning engagement with respective belts 59 and 60, see FIG. 1.

It will therefore be apparent that the mounting members or discs 43 and 45 are adapted to be driven or rotated in coaxial relation by respective belts 59 and 60 through pulleys 57 and 58.

A countershaft 65 extends rotatably from the partition 39, generally parallel to the drive shaft 56, and spaced laterally from the latter. The countershaft 65 is provided with a pair of rotary drive members or pulleys 66 and 67 in respective substantial coplanarity with mounting members 44 and 46, or the flanges thereof. Hence, an endless member or belt 68 may be trained about the pulley 66 and flange 48 of mounting member 44, while an additional endless member or belt 69 may be trained about the pulley 67 and its substantially aligned flange 50 of mounting member 46.

The forward ends of shafts 56 and 65 are provided with additional pulleys 70 and 71, respectively, and an additional endless drive member or belt 72 is trained about the pulleys 70 and 71 for transmitting power from the former to the latter. In this manner, the additional pulleys 66 and 67 of shaft 65 are caused to rotate simultaneously with the pulleys of shaft 56. Further, the direction of pulley rotation on shaft 65 may be reversed relative to that of the pulleys on shaft 56 by twisting of the belt 72, as best seen in FIGS. 1 and 2; and, an intermediate guide roller 73 may be located to engage the medial region of belt 72 and maintain the desired twisted relation.

It will now be apparent that the several transparent discs or mounting members 43–46 are mounted for simultaneous generally axial rotation in their respective planes, the speed of respective disc rotation being controlled by the diametral ratios of the disc flanges and respective driving pulleys.

Carried by each mounting member 43–46 is a transparent color separation of a picture. The color separation may be printed on acetate, or the like, and cemented to the respective mounting member, printed directly on the mounting member, or otherwise carried by the mounting member. In addition, illumination means, such as a lamp 75 may be mounted in the housing 31 on the rear wall 36 behind the partition opening 40 for passing illumination through the several mounting members 43–46.

As best seen in FIGS. 3–6, the mounting member or disc 43 carries a separation 76, which may be representative of the black separation of a full-color picture. The mounting member 44 may carry the blue separation 77 of the full-color picture, while the mounting member 45 may carry the yellow separation 78, and the mounting member 46 may carry the red separation 79. The color separations 76–79 are not accurate illustrations in the drawing, as color separations show, in general, the overall picture in the form of dots of the corresponding color whereas because of drawing limitations the dots are represented as dots or circles of varying size representative of the variations in a true separation.

Figure 7:
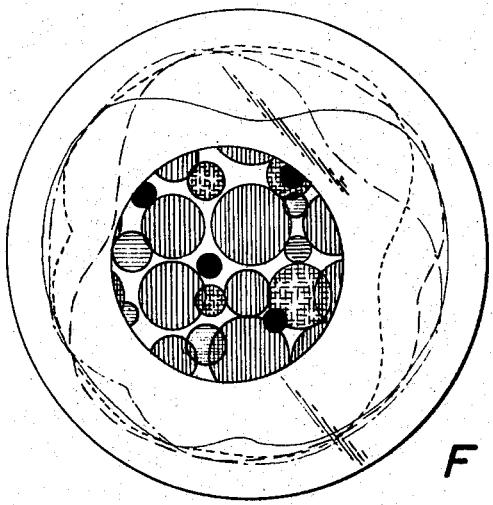
FIG. 7 is a diagrammatic representation of the separations of FIGS. 3–6 in superposed relation.

In FIG. 7 is shown a diagrammatic representation of the image produced by the several mounting members 43–46, carrying their respective color separations 76–79, all in superposed relation and out of registry with each other, say at a randomly selected position of operation of the device 30. For the purpose of clarity of illustration, only the outline of the respective separations are shown and because of size and color limitations they have not been color coded and are merely representative. However, a small central portion of the figure is shown in a representative magnified form and the dots therein are color coded to show the actual arrangement of dots as they appear when the separations are all in superposed relation.

In FIG. 1, the reconstructed image of the representations of FIGS. 3–7, resulting when all separations are in register, is shown. The illustration is there color-coded to show the full color impression visible to the eye. The quality of the individual separations, however, does not change and therefore the aforementioned moiré effect is produced when the individual separations are moved out of register.

A slightly modified embodiment is shown in FIG. 8, wherein a transparent disc or mounting member 43a is provided with peripheral teeth 59a for meshing engagement with a drive pinion 57a, alternatively to the drive-belt construction of the first-described embodiment.

A further embodiment is shown in FIG. 9, wherein a mounting member 43b is frictionally engaged by a grooved roller 57b for rotation in driven relation with the roller.

Another alternative structure is shown in FIG. 10, wherein a mounting member 43c is tangentially engaged in driven relation by an endless member or belt 59c trained about a pair of drive pulleys or rollers 57c.

Still another embodiment is shown in FIG. 11, wherein are shown a mounting member 43d and a drive disc 59d in frictional engagement with the mounting member and rotatable on a shaft 57d about an axis generally normal to the axis of rotation of the mounting member.

Of course, the several embodiments of FIGS. 8–11 are representative, without limitation, of various drive constructions for the several mounting members or discs 43–46.

Still another embodiment is shown in FIG. 12, wherein a plurality of transparent separation mounting members 43e, 44e, 45e and 46e are of endless, generally cylindrical configuration and of progressively smaller diameters for location one within the other. The mounting members 43e, 44e, 45e and 46e are each adapted to carry a respective color separation, and are suitably mounted for coaxial rotation, being respectively driven by respective rolls or other suitable drive means 57e, 66e, 58e and 67e. The diametral differences are not so great as to prevent the reconstruction of a full color image when the mounting members are in register.

Still a further embodiment is shown in FIG. 13, wherein a plurality of drive members 43f, 44f, 45f and 46f each constitutes an endless belt extending about an endless path and respectively driven by rollers or other suitable drive means 57f, 66f, 58f and 67f. The endless belts 43f, 44f, 45f and 46f may be of transparent acetate or other plastic, each carrying a respective color separation, moving continuously about its respective endless path, with the paths arranged one within the other for superposition of the color separations in view. Of course, the mounting members or belts 43f, 44f, 45f and 46f need not be endless, but may have opposite ends coiled about respective spools, if desired.

In order that the various drive members or endless belts may be of equal length, idler rollers 80, 81 and 82 may be provided to extend the path of same so as to take up any slack in the belts. It will be appreciated, however, that even in the event idler rolls 80, 81 and 82 are not provided, the variations in length of the respective drive members will not prevent the reconstruction of a fully legible full color image when all of the members are in register, and, in any event, the desired moire effects will be achieved when they are out of register or moved relative to each other.

Figure 14:
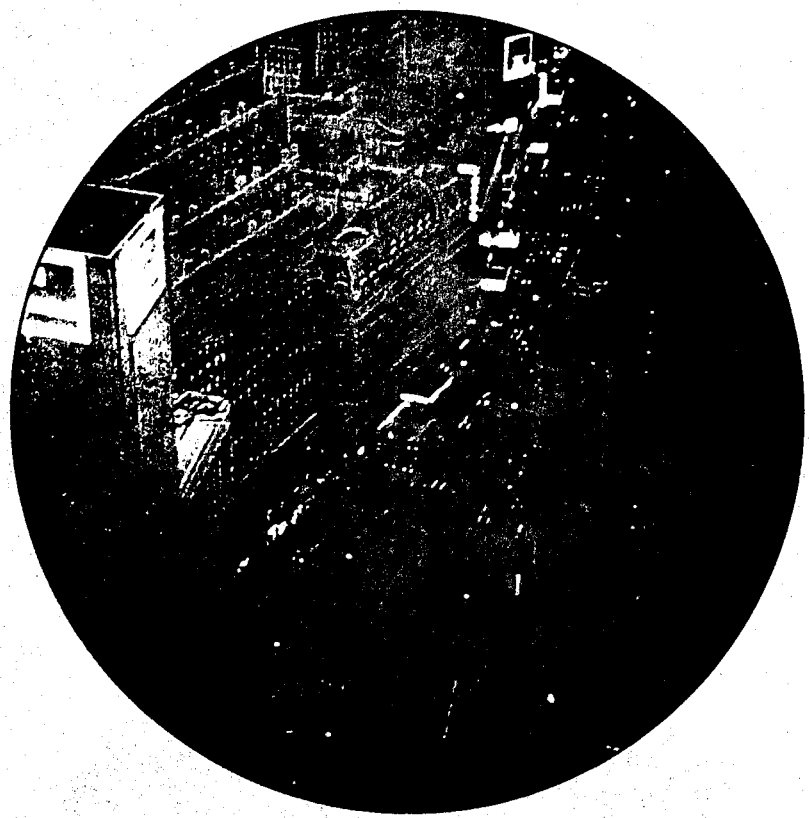
FIGS. 14, 15, 16 and 17 are photographic reproductions in black and white of respective color separations of a single color picture.
Figure 15:
Figure 16:
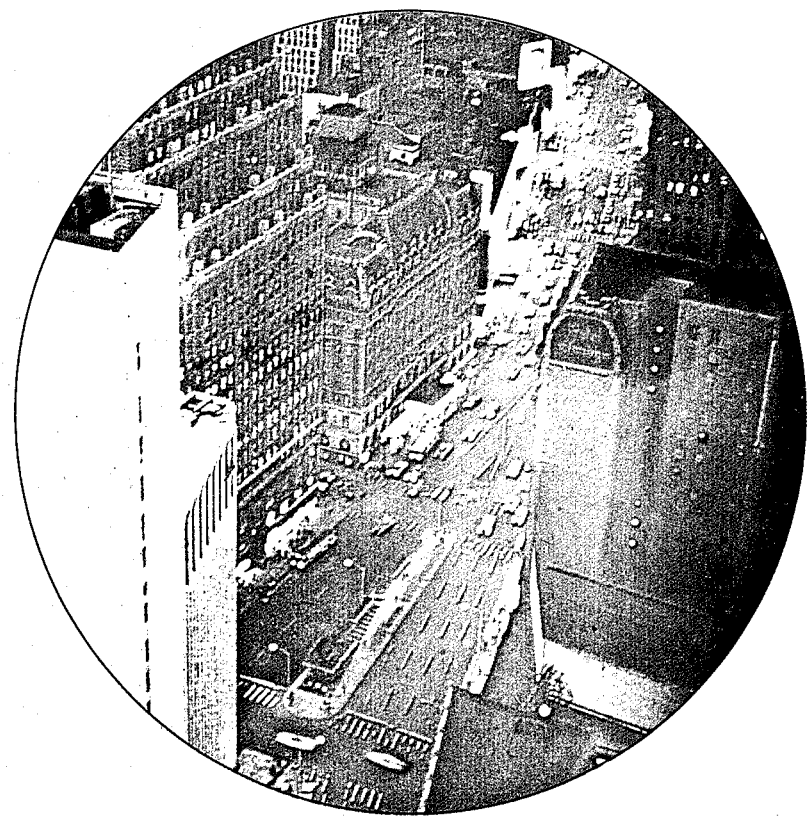
Figure 17:

Further, by way of exemplification the representation of FIG. 14 in black and white is that of a yellow color separation, while that of FIG. 15 is a black separation, that of FIG. 16 being a blue separation, and that of FIG. 17 being a red separation. By observation of FIGS. 14–17, each being entirely in its respective color, it will be understood that each separation presents substantially a complete picture, with areas thereof of varying intensity in accordance with the proliferation of the particular color in the full color picture.

Figure 18:
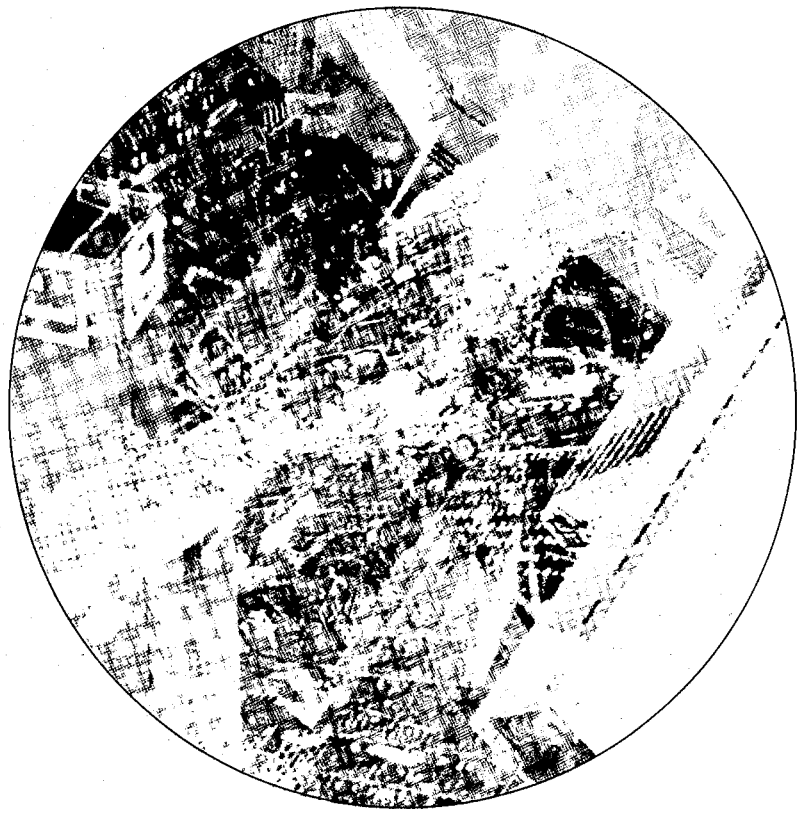
FIGS. 18, 19 and 20 are photographic reproductions in black and white of overlapping forms and moiré effects produced by the color separations of FIGS. 14–17 in accordance with the teachings of the instant invention.
Figure 19:
Figure 20:
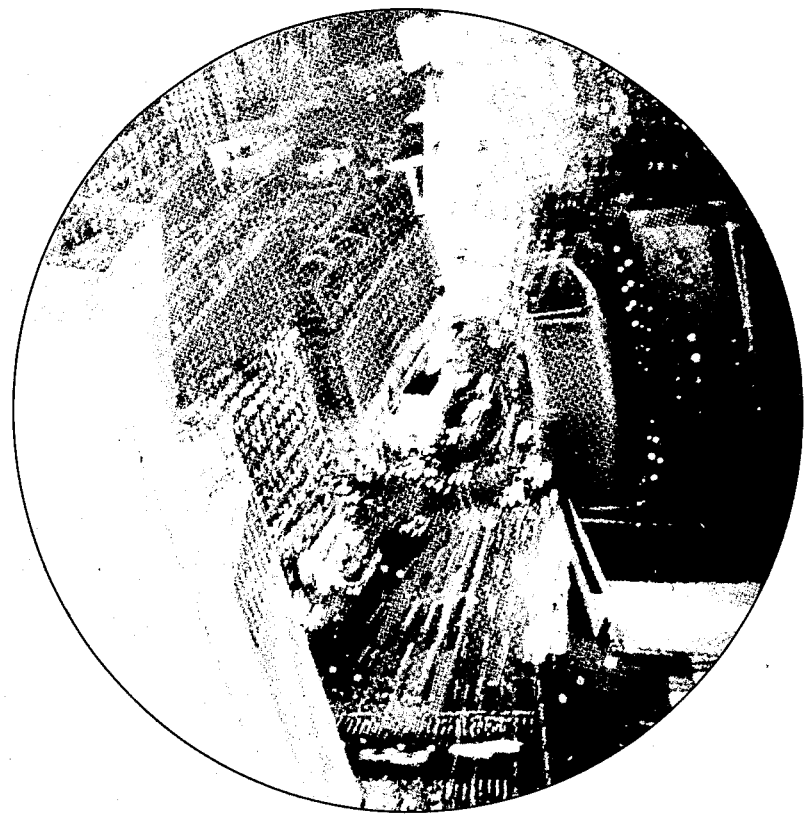

The representations of FIGS. 18, 19 and 20 are instantaneous black-and-white representations of the continually changing moiré effects achieved by observation of the color separations of FIGS. 14–17 in their superposed relation out of registry with each other. While it is not fully appreciated from FIGS. 18–20, the color and design changes occurring continuously are all related to the overall picture, in greater and lesser degrees, to produce a highly attractive esthetic effect. The four-color picture produced from the separations of FIGS. 14–17, when in register, is shown in FIG. 21, but in black and white.

The actual dot patterns of the various separations and of the composite images may be readily discernible by viewing the FIGS. 14–21 under a magnifying glass.

Figure 21:
FIG. 21 is a photographic reproduction in black and white of a picture produced by the color separations of FIGS. 14–17 in a device of the present invention in intermittent relation with the moiré visual presentations of FIGS. 18–20.

Thus, when discs containing the several color separations, FIGS. 14–17, are brought into register, a full-color picture, FIG. 21, appears, similar to color-printing procedures. When the discs are out of register, the superposition of the images of the separations is comparable to a futuristic abstract painting in motion as the color-image dot patterns overlap and blend together in such a way as to destroy the static reality of the subject and compose a constantly changing flow of images. During the transition of images moiré patterns flash and undulate as a result of the rotation of the half-tone separations. The dot patterns of these half-tones moving out of register form geometric clusters and waves, known as moirés, which create a pulsating, somewhat psychedelic visual rhythm at evolving intervals.

It will be also be appreciated that the movement of the separations may be discontinuous as well as continuous or that the relative movement thereof may be made at long intervals. In addition the mere superposition of separations in a fixed position, permanently out of register, will produce an abstract image of great novelty and artistic effect.

Figure 22:
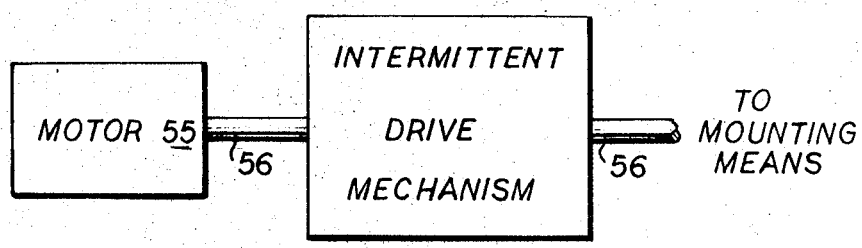
FIG. 22 is a schematic representation of the motive means for driving the mounting means intermittently.

Further, the method herein disclosed, of making color separations of a full color illustration, placing them in superposition, and moving the separations from a position out of register to a position in register, may be usefully and artfully employed for novel film and T.V. effects. As will be appreciated, the mounting means can be intermittently driven by a suitable drive mechanism such as that diagrammatically illustrated in FIG. 22.

Figure 23:
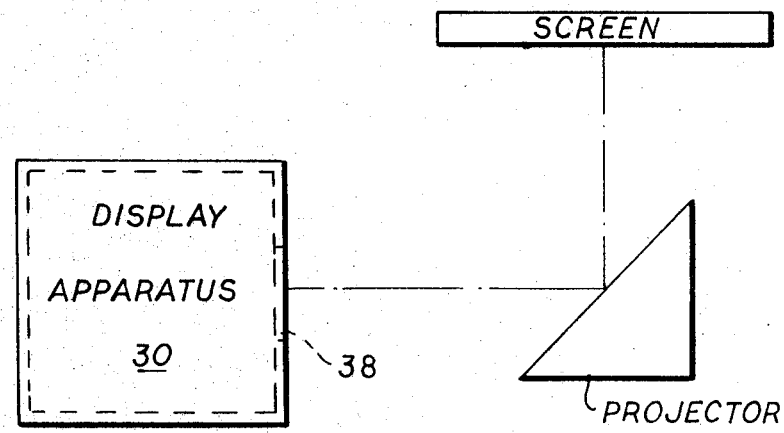
FIG. 23 illustrates diagrammatically the step of projecting a resulting image.
Figure 24:
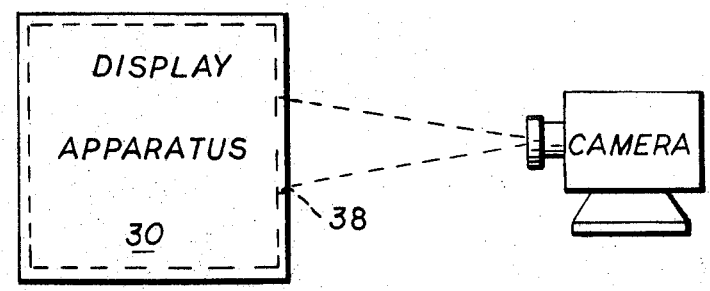
FIG. 24 diagrammatically represents the step of photographing the resulting image.

For example, apparatus of this invention may be utilized to practice the method herein disclosed, and the visual effects produced by this apparatus photographed with a moving picture camera thus to record, for eventual replay, the sequential development produced. It will also be appreciated that, in this manner, the method and apparatus of this invention may be utilized to introduce film sequences or picture titles by photographing the separations as they move from a position out of register to a position in register. Likewise other effects may be achieved by photographing the resulting image when separations are moved from a position in register to one out of register. In accordance with the present invention, FIGS. 23 and 24 respectively illustrate in diagrammatic fashion the steps of projecting the resulting image and the step of photographing the resulting image.

While four color separations have been illustrated and described in the preferred embodiments of this invention, it will be appreciated that any number of color separations may be employed, four having been selected for illustrative purposes only.

Further, it will be appreciated that the method and apparatus of this invention may utilize color separations, as hereinbefore described, as well as Ben Day prints. As is known in the art, Ben Day may be employed in color to produce brilliant flat tints, by simply laying screens upon the same part of the design, on more than one plate in a color set. The plates thus produced may be utilized in the same manner as the separations have been herein utilized. Therefore, for the purpose hereof, the term separation shall include also Ben Day prints.

Further, it will be appreciated that the resultant images, whether static or kinetic, may be projected, in any conventional manner, upon a remote surface.

From the foregoing, it is seen that the present invention provides a method and apparatus for composing and decomposing pictorial representations which fully accomplish their intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Apparatus for composing and decomposing pictorial representations comprising a plurality of color separations each of which represents a component aspect of a pictorial representation, said color separations being related to produce a unified color representation when viewed in a predetermined relationship; mounting means mounting said color separations for selective relative movement along continuous respective paths affording simultaneous visual presentation of said color separations in a superposed relation during said relative movement to produce moire images, said paths being arranged for movement of said color separations through said predetermined positions for intermittent presentation of said unified color representation; and motive means for driving said mounting means.

2. Apparatus according to claim 1, said mounting means mounting said separations for continuous relative movement along respective endless paths.

3. Apparatus according to claim 1, said mounting means mounting said separations for unidirectional movement along respective endless paths.

4. Apparatus according to claim 1, said mounting means mounting said separations for relative movement along coaxial rotary paths.

5. Apparatus according to claim 1, said separations being of the half-tone type.

6. Apparatus according to claim 1, said separations being transparent and movable along paths in parallel facing planes for simultaneous visual access through said plurality of separations.

7. Apparatus according to claim 6, in combination with illuminating means located for passing illumination through said planes.

8. Apparatus according to claim 1, said mounting means comprising endless members movable along respective endless paths.

9. Apparatus according to claim 8, said endless members and paths being located one within the other.

10. Apparatus according to claim 1, further including means for projecting the resulting image.

11. Apparatus according to claim 1, said color separations being transparent, and illumination means for passing illumination through said transparent separations.

12. A display device according to claim 11, further including means for projecting the resulting image.

13. A display device according to claim 11, said color separations being mounted out of registry.

14. A display device according to claim 11, further including motive means for driving said mounting means intermittently.

15. Method for composing pictorial representations comprising the following steps: producing a plurality of color separations on transparent material each of which represents a component aspect of a pictorial representation and said color separations being related so as to produce a unified color representation when viewed in a predetermined relationship, mounting said color separations for selective relative movement along continuous respective paths so as to afford simultaneous visual presentation of said color separation in a superposed relation, passing illumination through the planes of said color separations, and moving said color separations along continuous respective paths such that relative movement of said color separations produces moire images and also periodic visual presentation of said unified color representation for intermittent presentation thereof.

16. The method of claim 15, further including the step of projecting the resulting image.

17. The method of claim 15, further including the step of photographing the resulting image.

18. The method of claim 15, further including the step of moving said color separations along respective paths about their respective axes.

19. The method of claim 15, further including the step of mounting said color separations in a superposed relation other than said predetermined relationship.

References Cited

UNITED STATES PATENTS

| | | |
|---|---|---|
| 885,928 | 4/1908 | Hunt. |
| 1,182,266 | 5/1916 | Gibson. |
| 2,355,902 | 8/1944 | Berg. |
| 3,176,265 | 3/1965 | Schweighofer ____ 40—106.52 X |
| 3,245,310 | 4/1966 | Aldcroftt _____ 272—10 X |

FOREIGN PATENTS

| | | |
|---|---|---|
| 629,167 | 3/1962 | Belgium. |
| 645,698 | 7/1962 | Canada. |

EUGENE R. CAPOZIO, Primary Examiner

R. CARTER, Assistant Examiner

U.S. Cl. X.R.

40—132; 272—8